US00RE45432E

(19) United States
(12) Reissued Patent
Tan

(10) Patent Number: US RE45,432 E
(45) Date of Reissued Patent: Mar. 24, 2015

(54) AUTOMATIC VACUUM INK CONTAINER AND ITS INK SUPPLY DEVICE AND VACUUM PISTON DEVICE

(71) Applicant: Ciyuan Tan, Toronto (CA)

(72) Inventor: Ciyuan Tan, Toronto (CA)

(73) Assignees: Ciyuan Tan, Toronto, Ontario (CA); North America Wales Group International Ltd., Toronto, Ontario (CA)

(21) Appl. No.: 14/060,614

(22) Filed: Oct. 23, 2013

Related U.S. Patent Documents

Reissue of:
(64) Patent No.: 8,430,488
Issued: Apr. 30, 2013
Appl. No.: 12/979,244
Filed: Dec. 27, 2010

(51) Int. Cl.
*B41J 2/175* (2006.01)

(52) U.S. Cl.
USPC ..... 347/86; 347/84

(58) Field of Classification Search
USPC ..... 347/84, 85, 86, 87; 222/95, 325, 326, 222/327, 340, 493, 495
See application file for complete search history.

(56) References Cited

U.S. PATENT DOCUMENTS

| | | | | |
|---|---|---|---|---|
| 3,720,473 | A * | 3/1973 | Nakata | 401/40 |
| 5,485,187 | A * | 1/1996 | Okamura et al. | 347/85 |
| 5,799,578 | A * | 9/1998 | Junghans | 101/348 |
| 5,886,718 | A * | 3/1999 | Johnson et al. | 347/85 |
| 5,921,181 | A * | 7/1999 | Ritter | 101/366 |
| 6,193,364 | B1 * | 2/2001 | Iida | 347/86 |
| 6,428,152 | B1 * | 8/2002 | Hollands | 347/85 |
| 7,614,728 | B2 * | 11/2009 | Ghisalberti et al. | 347/84 |

* cited by examiner

*Primary Examiner* — Anh T. N. Vo

(57) ABSTRACT

An automatic vacuum ink container and its ink supply valve device and vacuum piston device. The ink container comprises a container cylinder, an ink supply valve mounted at one end of the container cylinder for opening and closing the passage of the ink, and a vacuum piston, mounted at the other end of the container cylinder and provided with more than one exhaust hole, for exhausting air when packaging ink and for pushing ink toward the ink supply valve when supplying ink. The ink supply valve comprises a valve lid and a valve sleeve; the valve lid can be pushed by ink to move forward to form a space for dispensing ink; two sloping sealing faces are provided respectively around the top of the valve sleeve and on the inner wall of the top of the valve lid. The exhaust pores are set through the vacuum piston longitudinally.

15 Claims, 7 Drawing Sheets

AUTOMATIC VACUUM INK CONTAINER AND ITS INK SUPPLY DEVICE AND VACUUM PISTON DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*There is more than one reissue application based on U.S. Pat. No. 8,430,488. The present application Ser. No. 14/060,614 is a reissue of U.S. Pat. No. 8,430,488. Application Ser. No. 14/180,523 is a continuation in part of application Ser. No. 14/060,614. Application Ser. No. 14/180,538 is also a continuation in part of application Ser. No. 14/060,614.*

BACKGROUND

1. Field of the Invention

The present invention relates to an automatic vacuum ink container, more specifically, to the automatic vacuum ink container that can be applied in mechanized ink-filling production and vacuum package and store, and used with the automatic ink supply equipment, and to its ink supply valve device and vacuum piston device.

2. Description of Related Arts

In the printing field, the modern printing machine has gradually started to use the automatic ink supply technology. The plastic ink container, which is used with the automatic ink supply equipment, is a cylinder. There is a piston provided at its rear end and an ink-spilling mouth provided at its front end. A sealing lid is put over the outer wall of the ink-spilling mouth in order to close the mouth. However, this type of structure allows the air to get into the cylinder through the gap in between the cooperating area of the ink-spilling mouth and the sealing lid; when packaging the piston of the rear end, air can not completely exhaust out of the cylinder and it makes the air stay in the cylinder; as a result, the ink is oxidized, and it in turn influences the quality of the ink, blocks the ink spilling mouth, and eventually disenables the ink' flowing out.

A U.S. Pat. No. 6,309,059B1, titled "cartridge stopper with a valve function", discloses a cartridge stopper, designed especially for the plastic printing ink cartridge. A convex central body is designed to be connected through a mouthpiece neck of the cartridge with the cartridge cylinder. The main disadvantages are as follows:

1. A valve sleeve is put over the outer wall of the convex central body, which allows the spherical top of the convex central body to pass through the annular ink-spilling mouth of the top of the valve sleeve, and allows the rim of the valve sleeve to cling to the spherical top of the convex central body. Due to the very little sealing area of this sealing structure between the valve sleeve and the convex central body, which is almost just an annular line and the sealing width is less than 1 mm, once the hot ink gets cooling down after the package procedure, the volume of the ink gets contracting and accordingly produces negative pressure; plus the gravity, it makes it very easy for the air outside to get into the joint of the valve sleeve and the convex central body. Therefore, it causes the ink to get oxidized and get peeling, and accordingly affects the quality of the ink, clogs the ink spilling mouth, and eventually cuts off the ink supply.

2. The connection fashion of the valve sleeve and the convex central body is not tight, easy to be loose, which also makes it for the air to get into the cylinder from the loose cooperation gap.

3. Besides, due to the short stroke, which is less than 3 mm, of the S-shaped wall ribs of this patent in the valve sleeve, the annular ink-spilling mouth, which size depends on the stroke of the S-shaped wall ribs, is just a narrow space. Therefore, it is likely for the ink-spilling mouth to get clogged; the ink pressure gets increased, and then accordingly causes the occurrence of unexpected ink spurt.

4. Also, the structure of the S-shaped wall ribs makes the minimum working pressure for opening the ink spilling mouth to be more than 5 bar, which is too high and likely to cause the piston inside the cylinder to turn sideways and further disenables the ink supply.

5. The connection structure and sealing fashion of the inner wall of the U-profile window and the outer wall of the mouthpiece neck of the convex central body make it likely happen that the ink, under pushing, leaks from the gap between the inner wall of the U-profile window and the outer wall of the mouthpiece neck.

6. The patent is designed only for being used with the plastic cylinder of an ink container. However, the performance and quality of plastic cylinders is not stable, and the cooperation gap between the cylinder and the piston can not be guaranteed very well.

Except for the above-described shortcoming the current ink-spilling products have, the other main shortcoming is that when packaging the piston of the rear end of the cylinder, the piston can not completely exhaust the air out of the cylinder.

A Chinese patent, the application number being 200710099625.8, titled "Pneumatic vacuum ink container", discloses a vacuum ink container, which sets multiple exhaust holes at the sides of the piston. The main disadvantages are as follows:

1. The axis of the two exhaust pores is perpendicular to the axis of the plastic cylinder and the air inlets of the exhaust pores are located at the sides of the front end face of the piston. Therefore, the exhaust pores on the sides are not able to expel all air in the container cylinder, and it accordingly causes the ink to be oxidized and peel, and eventually influences the quality.

2. Because there is no any sealing device to cover the air outlets of the exhaust pores on the rear end face of the piston, ink would leak out from them.

3. In addition, the cylindrical bulge of the piston and the vertical ink-guiding groove on the surface of the cylindrical bulge hinder the air from exhausting. When the piston is pushed by an outer force to move along the inner wall of the cylinder, because the top of the cylindrical bulge impacts the ink and produces central whirlpools bigger than the cylindrical bulge itself, the ink under the impact will move toward the peripheral area of the bulge; therefore, the air in the cylinder will rapidly flow to and gather around the cylindrical bulge and the vertical ink-guiding groove, and can not exhaust out of the cylinder. When the bulge entirely gets into the ink and the ink covers the frontal end face of the piston, there is still air staying around the cylindrical bulge and at the vertical ink-guiding groove, which will make the ink to peel and dry, and accordingly affect the ink quality directly.

4. The container cylinder is also made of plastic. The conventional plastic cylinder tends to expand and contract more easily as the temperature changes; thus, it is easier to deform and crack. In addition, the taper degree generated during the manufacture might cause the inner diameter of the container cylinder with a smaller front part and a bigger rear part, which will influence the cooperation gap between the container cylinder and the vacuum piston. When the cooperation is looser, the piston might separate from the cylinder, while the cooperation is tighter, the pressure of supplying ink increases, and in turn causes higher pressure in the cylinder, then the piston will be stuck in the cylinder and it finally fails to supply the ink.

In consideration of these shortcomings of the piston, which can not exhaust air out completely, the current ink container or cartridge is not the real "vacuum".

SUMMARY OF THE INVENTION

One objective of the present invention is to provide an automatic vacuum ink container so as to overcome the shortcomings of the current technology, which is suitable for mechanized filling production, for vacuum packaging and storing offset ink, and which can make it fulfilled that the ink does not peel and is used up thoroughly, and which can be used with the automatic ink supply equipment.

According to the present invention, the ink container comprises a container cylinder, an ink supply valve mounted at one end of the container cylinder for opening and closing the passage of the ink, and a vacuum piston, mounted at the other end of the container cylinder and provided with more than one exhaust hole, for exhausting air when packaging ink and for pushing ink toward the ink supply valve when supplying ink. The said ink supply valve comprises a valve lid connected directly with the container cylinder, as well as a valve sleeve embedded into the valve lid; the valve lid can be pushed by ink to move forward so as to form a space for dispensing ink; two sloping sealing faces are provided respectively around the top of the valve sleeve and on the inner wall of the top of the valve lid, which can cooperate with each other to seal the container and cut off ink. The said exhaust pores are set through the vacuum piston longitudinally.

The valve lid comprises an end face connected with the container cylinder, a mouthpiece neck connected with the end face, an annular top with an ink supply opening set at the center, and an elastic coupling connecting the annular top and the mouthpiece neck. A sloping sealing face is set around the inner side of the ink supply opening.

The valve sleeve comprises a stepped sleeve cylinder, a flat top, and ribs connecting the flat top and the stepped sleeve cylinder. Multiple cavities are formed in between the ribs. The flat top is set at the center of the upper end of valve sleeve. Around the rim of the flat top is provided a sloping sealing face, cooperating with the sloping sealing face of the valve lid. The ribs specifically connect the upper end of the sleeve cylinder and the lower end of the sloping sealing face of the flat top.

The elastic coupling can be springs. For a longer stroke, WI-shaped spring (a "W" plus a "I" put at the middle of the W) is strongly recommended. Compared to the less than 3 mm stroke of the S-shaped elastic coupling described in the U.S. Pat. No. 6,309,059B1, the WI-shaped spring of the present invention has as long stroke as 8 mm. In addition, the WI-shaped spring has as little working pressure as 1 bar, which is very helpful to keep the piston working stably in the cylinder, compared to at least 5 bar of the US patent. Therefore, when supplying ink, the annular top of the valve lid, pushed by stretching WI-shaped spring, can move forward as long as 8 mm; as a result, it can ensure that the area of the annular ink supply opening can be opened big enough, so that ink can flow out smoothly.

The vacuum piston comprises a cylindrical piston body, a conic bulge set at the central area of the frontal end face of the cylindrical body; and a piston lid mounted at the rear end face of the piston. The bulge can structurally match the valve sleeve of the ink supply valve. The more than one exhaust pores are set on the frontal end face around the conic bulge, or set at the lower part of the conic bulge, and all the way go to the rear end face of the cylindrical piston body. The piston lid is for covering and sealing the exhaust pores going to the rear end face of the piston.

The automatic vacuum ink container further comprises a balance cover, which is detachably connected with the ink supply valve for placing steadily and further sealing the ink container and comprises a bottom plate, a cover cylinder and a central lid. The lower end of the cover cylinder is pressed on the rim of the valve lid.

Another objective of the present invention is to provide a vacuum piston used in ink supply system, which can fulfill the real vacuum package and store of ink. The vacuum piston comprises a cylindrical body, a conic bulge set at the central area of the frontal end face of the cylindrical body, and a piston lid mounted at the rear end face of the piston. More than one exhaust pores is set on the frontal end face around the conic bulge or set at the lower part of the conic bulge, and all the way go to the rear end face, the preferred direction of the exhaust pores being axial. An annular groove is formed on the rear end face in such a manner that the inner and outer wall of the annular groove project out from the rear end face; the piston lid cooperates with the annular groove to seal the outlets of the exhaust pores on the rear end face of the piston.

Another objective of the present invention is to provide an ink supply valve used in ink supply system. The ink supply valve comprises a valve lid and a valve sleeve embedded into the valve lid. The valve lid is provided with an elastic coupling, so that when it is pushed forward, there is a space formed between the valve lid and the valve sleeve. Two sloping sealing faces are provided respectively around the top of the valve sleeve and on the inner wall of the top of the valve lid, which can cooperate with each other to seal the space formed between them.

The main apparent advantages of the present invention are as follows:

With the cooperation of two sloping sealing faces in the valve sleeve and valve lid, the sealing contact area is increased drastically, which can be as wide as more than 5 mm, then it accordingly guarantees the real vacuum storing of the ink in the container. In addition, the structure of the ink supply valve, which arranges the valve lid to be connected with the container cylinder directly and embeds the valve sleeve into the valve lid, makes them connected tightly and not easy to become loose.

Through a lot of experiment, the WI-shaped spring has quite strong strength, is less likely broken, big deflection, little stretch and deflection resistance, and sensitive to stretch and restore. With the WI-shaped spring set between the mouthpiece neck of the valve sleeve and the annular top, the stretch and deflection resistance of the spring get less, the forward movement of the annular top gets longer when supplying ink, which can reach more than 8 mm long, and in turn the annular ink supply opening gets bigger accordingly; as a result, the ink supply becomes smooth and efficient. Likewise, when sealing, the spring tension is strong, and the sealing performance is reliable.

With a conic bulge and multiple exhaust pores set longitudinally, preferably axially, in the vacuum piston, the air between the piston and the container cylinder can exhaust out completely; accordingly, it can be accomplished to vacuum package ink containers. By setting exhaust tubes and piston lid on the rear end face of the vacuum piston, the sealing at the rear end of the ink container gets more effective; also, the operation becomes more convenient. All of those features at the piston fit the mechanized package. The design of the ink-scraping ring helps the container cylinder to remove residual ink, which increases the usage efficiency of ink.

It is preferable to use paper as the material of the container cylinder, because the performance of the paper cylinder is more stable and more durable, and thus guarantees the normal cooperation gas between the container cylinder and the piston, which in turn ensure the quality of packaging, storing and supplying ink. Another benefit of using paper is environment-friendly.

The balance cover is for placing the container upright more steadily. In addition, the inner sealing top of the balance cover and the top wall of the ink supply opening of the valve lid are cooperating tightly with each other, thus, the ink container is sealed one more time and it further ensures the vacuum state.

The following is the reference number and assigned name. 1—container cylinder; 2—ink supply valve; 3—vacuum piston; 4—balance cover; 5—the outer side wall 5 at the frontal end face of the piston; 6—annular embedding groove; 7—stepped sleeve cylinder; 8—stepped valve sleeve; 9—raised location ring; 10—circular sealing slot; 11—circular sealing wall; 12—ribs; 13—sloping sealing face of the valve lid; 14—sloping sealing face of the valve sleeve; 15—sealing top of the balance cover; 16—flat top of the valve sleeve; 17—cavities of the valve sleeve; 18—central top of the balance cover; 19—inner top of the valve sleeve; 20—top wall of the ink supply opening of the valve lid; 21—annular top of the valve lid; 22—inner wall of the annular top; 23—WI-shaped spring; 24—central lid of the balance cover; 25—cover cylinder; 26—inner hole of the valve lid; 27—mouthpiece neck; 28—thread latch; 29—latch of the balance cover; 30—anti-slip groove; 31—bottom plate of the balance cover; 32—end face of the valve lid; 33—the front end of the container cylinder; 34—rim of the container cylinder; 35—valve lid; 36—inner end face of the valve lid; 37—circular concave sealing groove; 38—sealing skirt; 39—exhaust pores; 40—rear end face of the vacuum piston; 41—ink-scraping ring; 42—inner wall of the container cylinder; 43—double fixing slot; 44—double fixing column; 45—annular groove of the vacuum piston; 46—exhaust tubes; 47—outlet of the exhaust pores; 48—inner wall of the piston lid; 49—inner wall of the annular groove; 50—piston lid; 51—frontal end face of the piston lid; 52—outer wall of the piston lid; 53—outer wall of the annular groove; 54—singular column; 55—singular slot; 56—side wall of the inner end face of the valve lid; 57—rear end of the container cylinder; 58—outer wall of the vacuum piston; 59—vacuum piston; 60—frontal end face of the vacuum piston; 61—conic bulge; 62—top of the conic bulge; 63—raised latch on the outer wall of the valve sleeve; 64—ink supply opening; 65—lock groove; 66—ink supply passage; 67—sealing holes of the vacuum piston; 68—inner wall of the sealing slot 10; 69—outer wall of the sealing slot 10.

DETAILED DESCRIPTION OF PREFERRED EMBODIMENT

In the following detailed description of the embodiments, reference is made to the accompanying drawings.

Figure 1:
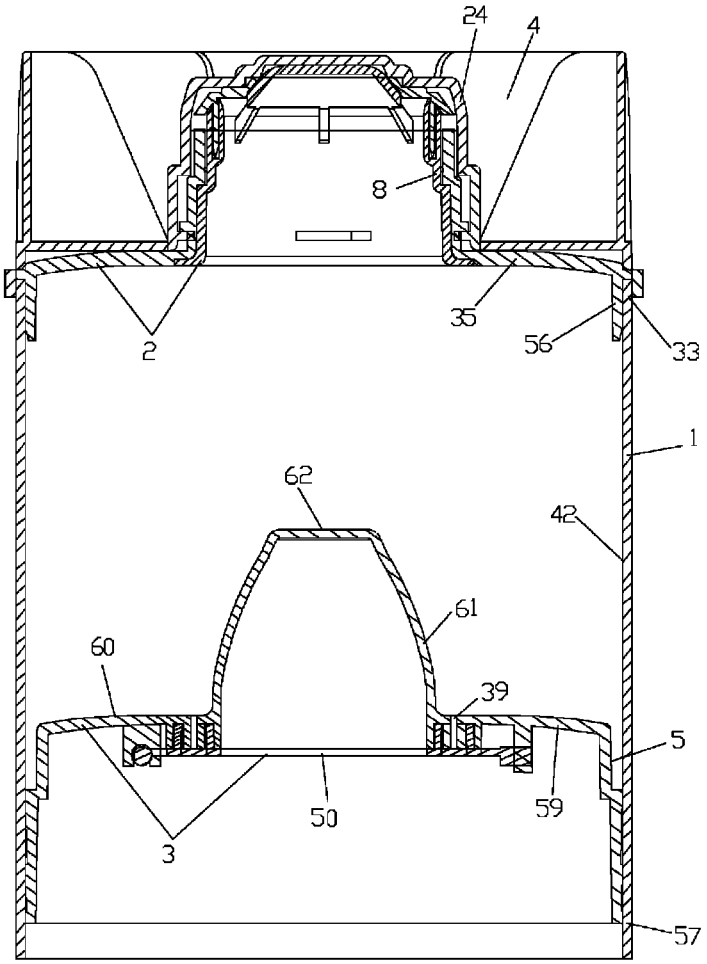
FIG. 1 is a front section view of the automatic vacuum ink container of one embodiment of the present invention.

Referring to FIG. 1, the automatic vacuum ink container of the present invention comprises a container cylinder 1, an ink supply valve 2, a vacuum piston 3 and a balance cover 4. The vacuum piston 3 is located within the container cylinder 1 and at the rear end of the ink container for sealing the ink container. The ink supply valve 2 is located at the frontal end of the ink container. The balance cover 4 is mounted on the ink supply valve.

The container cylinder 1 can be made of different materials. The embodiment uses paper as the material, because the performance of the container cylinder made of paper is more stable and more durable. In addition, paper-made cylinder can guarantee better normal gap between the inner radiuses and the vacuum piston, which is helpful for the ink quality during packaging, sealing and storing. Environment-friendly is also another advantage. The inner wall of the cylinder is covered with aluminum foil.

Figure 7:
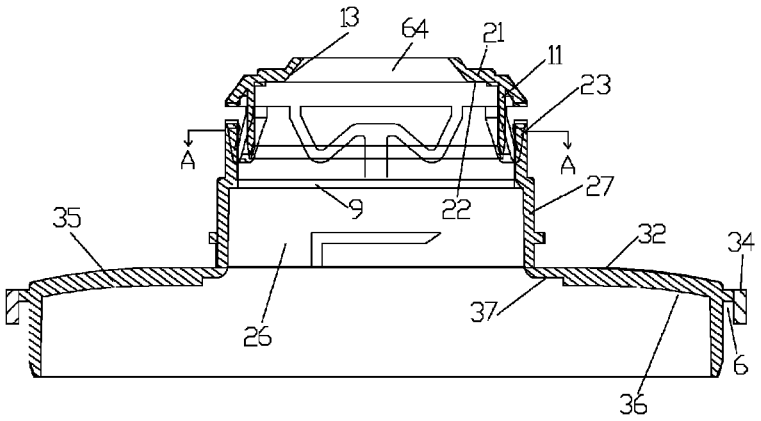
FIG. 7 is the front section view of the valve lid of the automatic vacuum ink container of the present invention.
Figure 8:
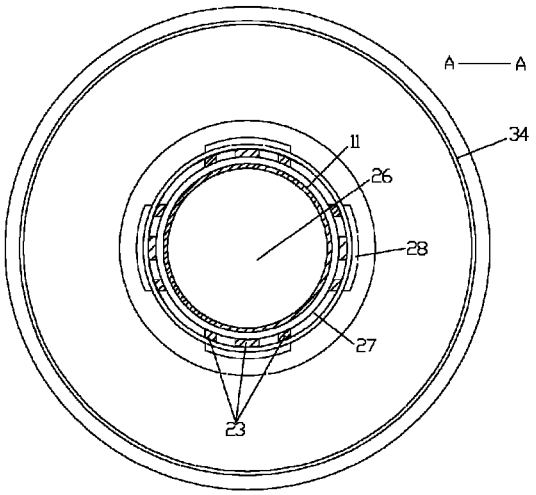
FIG. 8 is the section view at A-A direction of FIG. 7.

Referring to FIG. 1 and FIG. 7, the ink supply valve 2 comprises a valve lid 35 and a valve sleeve 8, wherein the valve sleeve 8 is tightly embedded into the valve lid 35 from within the inner hole 26 of the valve lid.

Figure 2:
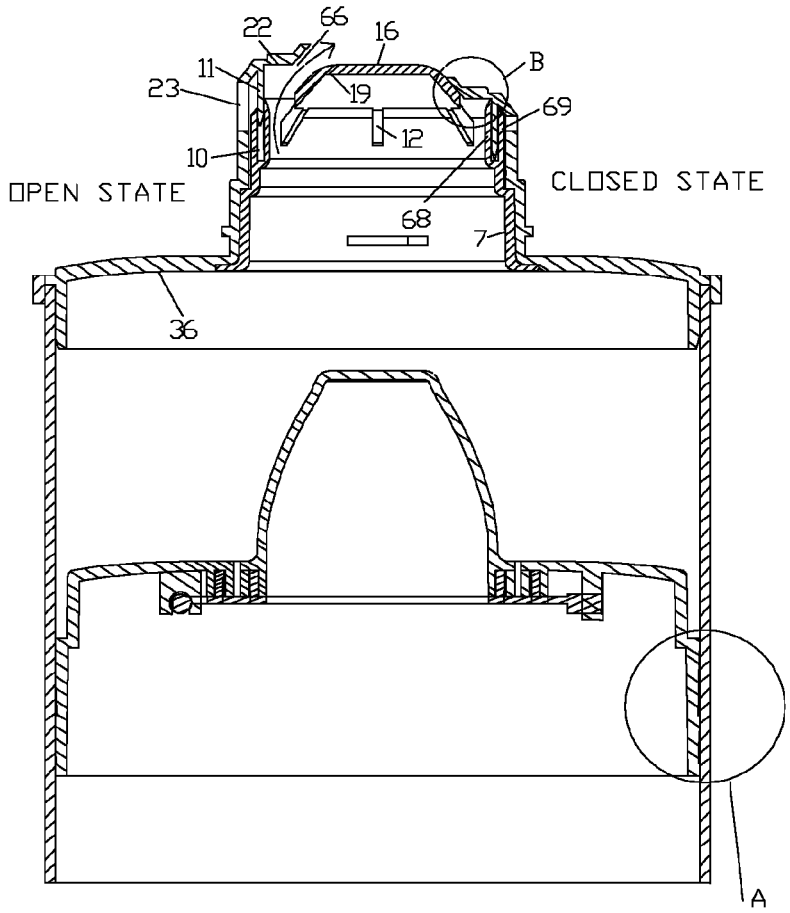
FIG. 2 is a schematic front section view, showing two states of the automatic vacuum ink container, the left half is the open state and the right half is the close state.
Figure 5:
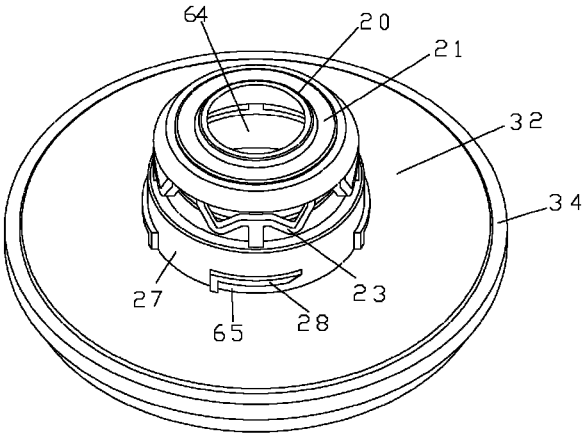
FIG. 5 is the perspective view of the valve lid of the automatic vacuum ink container of the present invention.

As shown in FIG. 5, the valve lid 35 comprises an end face 32, a mouthpiece neck 27, an annular top 21 and a WI-shaped spring 23. Referring FIG. 1 and FIG. 5, There is an annular embedding groove 6 set downwardly and axially around the rim 34 of the end face 32 of the valve lid 35, which is designed to match the ink container cylinder 1; the embedding groove 6 shown in FIG. 7 can be inserted into the frontal end 33 of the container cylinder. With the annular embedding groove set around the rim of the end face of the valve lid, the connection between the valve lid and the container cylinder becomes more convenient and secure. There is a circular ink supply opening 64 set at the center of the annular top 21, as shown in FIG. 5. As shown in FIG. 2, FIG. 5 and FIG. 7, the WI-shaped spring 23 extends down axially from the rim of the annular top 21 and is connected to the upper end of the mouthpiece neck 27, so that the WI-shaped spring and the annular top can axially stretch forward together. Then, it can accordingly open up an annular ink supply passage 66 shown in FIG. 2; thus, the ink can flow through the annular ink supply passage 66 and flow out of the ink supply opening 64. As shown in FIG. 7, on the upper end of the inner wall of the mouthpiece neck 27 is set a raised location ring 9 for locating the valve sleeve 8. Referring to FIG. 2 and FIG. 7, a circular sealing wall 11 extends downwardly and axially in the space between the inner wall of the ink supply opening 64 and the WI-shaped spring 23. Referring FIG. 3, FIG. 5 and FIG. 7, a sloping sealing face 13 is set around the inner side of the ink supply opening 64, which structurally cooperates with the corresponding sloping sealing face 14 on the flat top of the valid sleeve to seal the ink container. In FIG. 5, on the outer wall of the mouthpiece neck 27 are set multiple raised thread latches 28 for matching corresponding latches of the balance cover; under the thread latches are set corresponding thread latch grooves 65. As shown in FIG. 7, there is provided a circular concave sealing groove 37 at the lower part of the inner hole of the valve lid 35, especially on the rear end face of the valve lid, to which a corresponding sealing skirt 38, shown in FIG. 6, of the valve sleeve tightly clings.

Figure 6:
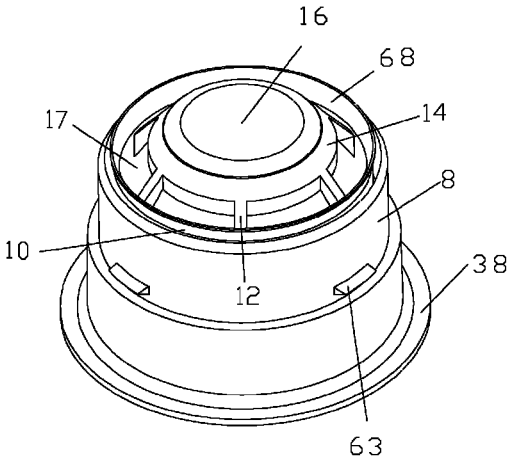
FIG. 6 is the perspective view of the valve sleeve of the automatic vacuum ink container of the present invention.

Referring to FIG. 6, the valve sleeve 8 comprises a stepped sleeve cylinder 8, a flat top 16, ribs 12 and a sealing skirt 38. Multiple cavities 17 are formed among the ribs 12 for allowing ink to flow out when supplying ink.

Figure 3:
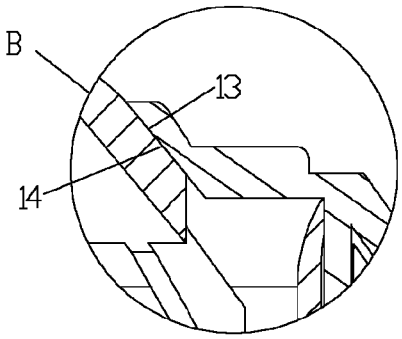
FIG. 3 is the enlarged view of part B of FIG. 2.

Referring FIG. 6 and FIG. 3, around the rim of the flat top 16 is provided a sloping sealing face 14, which structurally matches the corresponding sloping sealing face 13 of the valve lid; under the stretch of the WI-shaped spring, the two sloping sealing faces will tightly cooperate with each other, and accordingly seal the ink container. The ribs 12 connect the flat top 16 and the stepped sleeve cylinder, specifically, connect the upper end of the stepped sleeve cylinder and the lower end of the sloping sealing face 14. At the upper end face of the sleeve cylinder is set a circular sealing slot 10 for allowing the circular sealing wall 11 of the valve lid to be inserted into it. The upper end 68 of the inner wall of the sealing slot 10 is formed to incline toward the center of the slot. When ink is being dispensed out, the pressure of the ink will push the upper end 68 of the inner wall of the sealing slot 10 to cling tightly to the inner wall of the circular sealing wall 11 of the valve lid, so that it can ensure that the ink will not leak out from the gap between the inner wall of the sealing slot 10 and the sealing wall 11. There are raised latches 63 set at the middle part of the outer wall of the sleeve cylinder to cooperate with the raised location ring 9 of the valve lid and to further play the role of location; the raised latches 63 can go beyond the raised location ring 9 of the valve lid and be located on it and the mouthpiece neck 27 of the valve lid, which action in turn can bring the whole stepped sleeve cylinder upward and make the step of the stepped sleeve cylinder exactly fit into the corresponding circular space formed under the raised location ring of the valve lid; therefore, the raised latches and the circular step of the stepped cylinder are both play the sealing role, when cooperating with the raised location ring and the circular space of the valve lid respectively. Also, the raised latches press upward the sloping sealing face 14 and make it tightly cooperate with the sloping sealing face 13 of the valve lid. As shown in FIG. 6, a sealing skirt 38 is set at the lower end of the stepped sleeve cylinder 8 to cooperate structurally with the concave sealing groove 37 of the valve lid; when the said raised latches 63 go beyond the raised location ring 9 of the valve lid, it also brings the lower part of the stepped sleeve cylinder up and makes the sealing skirt 38 cling to the concave sealing groove 37 tightly.

In the present embodiment, when the valve sleeve 8 is being embedded into the inner hole 26 of the valve lid 35, the raised latches 63 of the valve sleeve is exactly put on the raised location ring 9 of the valve lid, and the sloping sealing face 14 of the valve sleeve and the sloping sealing face 13 of the valve lid cooperate with each other tightly, with the sealing width being able to be as wide as more than 5 mm. The circular sealing wall 11 of the valve lid is inserted into the sealing slot 10 of the valve sleeve, the upper end 68 of the inner wall of the sealing slot 10 being toward the center of the slot and cooperating with the inner wall of the circular sealing wall 11 of the valve lid tightly. The orientation of the ink cavities 17 among the ribs 12 are toward the inner wall 22 of the annular top 21 of the valve lid. The sealing skirt 38 of the valve sleeve is exactly attached to the circular concave sealing groove 37 at the lower part of the valve lid on the inner end face.

Figure 4:
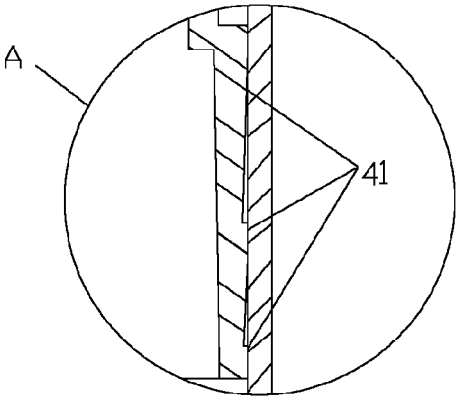
FIG. 4 is the enlarged views of part A of FIG. 2.
Figure 9:
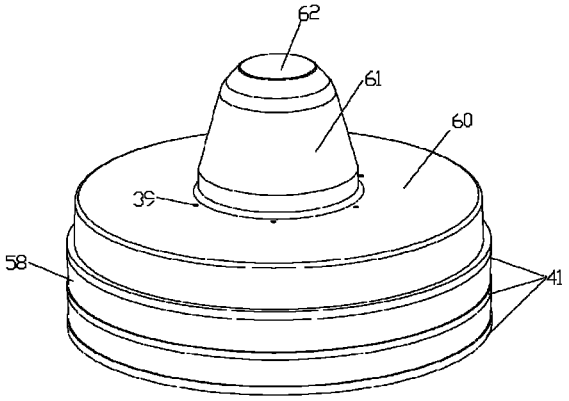
FIG. 9 is the front perspective view of the vacuum piston of the automatic vacuum ink container.
Figure 10:
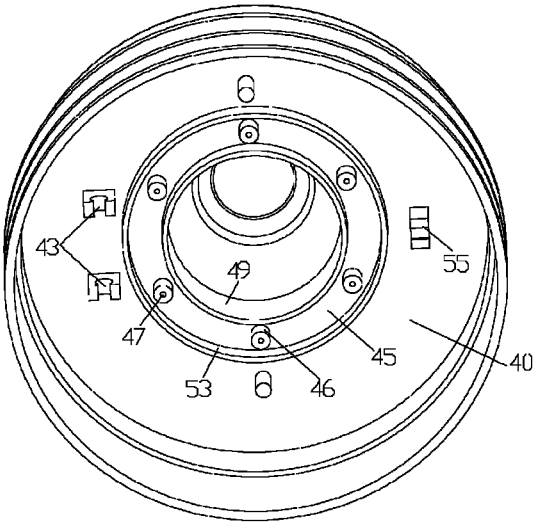
FIG. 10 is the bottom perspective view of the vacuum piston of the automatic vacuum ink container.
Figure 11:
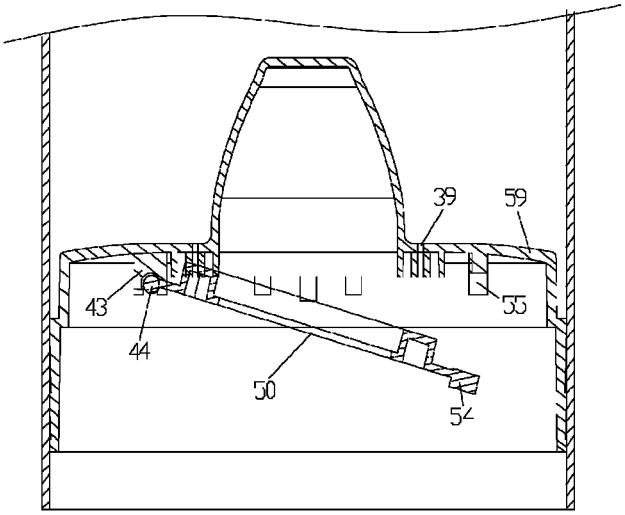
FIG. 11 shows a schematic section view of the state of the piston lid before the vacuum piston is closed.
Figure 12:
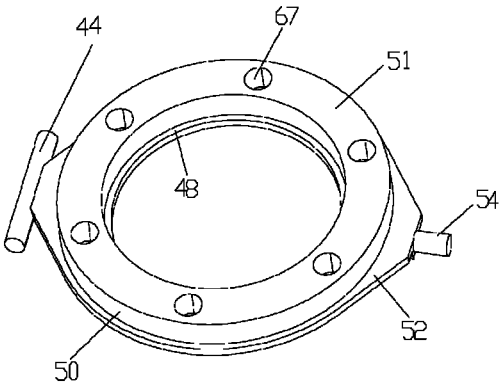
FIG. 12 is the perspective view of the piston lid.

Referring to FIG. 9, the vacuum piston 59 comprises a cylindrical piston body, a conic bulge 61, and a piston lid 50. The conic bulge 61 is formed at the central area of the frontal end face 60 of the piston body. The inlet of multiple exhaust pores 39 is opened on the frontal end face 60 of the piston around the conic bulge 61; the exhaust pores all the way go to the rear end face of the piston; the preferred direction of the exhaust pores is axial. Referring to FIG. 10, an annular groove 45 is formed on the rear end face of the piston in such a manner that the inner wall 49 and outer wall 53 of the annular groove project out from the rear end face of the piston. Referring to FIG. 12, the piston lid 50 is mounted at the rear end face of the piston. The piston lid is for covering the annular groove, and eventually for sealing the whole piston. Referring to FIG. 10, same number of exhaust tubes 46 is set in the annular groove 45; the said exhaust pores 39 extend into the exhaust tubes from the frontal end face of the piston and the outlet 47 of the exhaust pores is set on the end face of the exhaust tubes; the exhaust tubes 46 are set with the same direction as the exhaust pores. Referring to FIG. 10, FIG. 11 and FIG. 12, there are double fixing slots 43 and singular fixing slot 55 set on the rear end face of the vacuum piston to match and fix the double fixing columns 44 and singular fixing column 54 set in the piston lid. There are set corresponding sealing holes 67 on the frontal end face 51 of the piston lid 50 to seal the outlet 47 of the exhaust pores at the exhaust tubes 46; the frontal end face 51 of the piston lid clings to the bottom of the annular groove 45. The piston lid 50 also has an inner and outer ring to match the inner wall 48 and outer wall 52 of the annular groove 45, respectively. As ink is being dispensed out, the vacuum piston will move toward the ink supply valve, then finally its frontal end face 60 will cooperate with the inner end face 36 of the valve lid 35, and the outer side wall 5 at the frontal end face 60 of the piston will cooperate with the inner side wall 56 of the valve lid 35. As shown in FIG. 9, FIG. 2 and FIG. 4, on the outer wall 58 of the vacuum piston is provided an ink-scraping ring 41, both the outer wall 58 and the ink-scraping ring 41 being able to interference fit with the inner wall 42 of the container cylinder.

Figure 13:
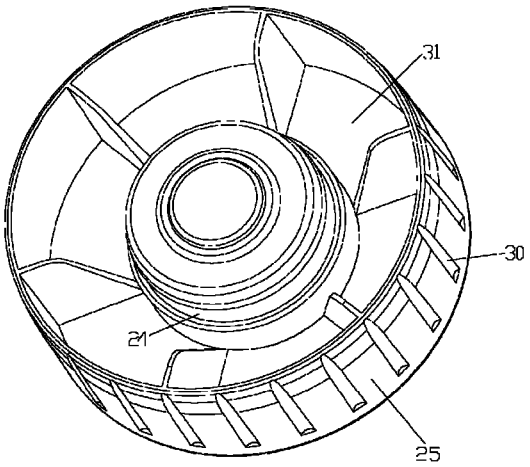
FIG. 13 is the top perspective view of the balance cover.
Figure 14:
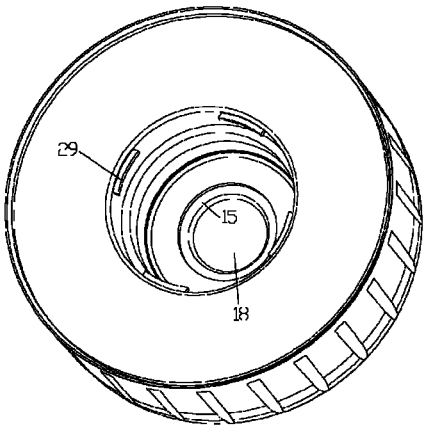
FIG. 14 is the bottom perspective view of the balance cover.

Referring to FIG. 13 and FIG. 14, the balance cover comprises a bottom plate 31, a cover cylinder 25 and a central lid 24. There are catches 29 set on the inner wall of the central lid 24. The central lid 24 is also provided with an inner sealing top 15, which cooperates tightly on the top wall 20 of the ink supply opening of the valve lid, so as to fulfill the second time sealing to the ink container. On the outer wall of the cover cylinder 25 are set anti-slip grooves 30. Between the cylinder 25 and the bottom plate 31 are set some reinforced plates. By turning, the latches 29 can be locked tightly into the thread latch grooves 28 of the mouthpiece neck 27 of the valve lid 35. The lower end of the cover cylinder 25 is pressed on the rim of the valve lid. The design of the balance cover allows the ink container to be placed steadily.

Referring to FIGS. 1, 9, 10, 11 and 12, during packaging and sealing ink, the ink supply valve 2 of the automatic vacuum ink container of the present invention is put upside down. Inject the hot ink into the container cylinder 1 from the rear end 57 of the cylinder. After the cylinder 1 is full of the hot ink, put the vacuum piston 3 on the rear end 57 of the cylinder. The packaging machine will push the vacuum piston 3 to slide toward the ink supply valve 2, during which the air between the cylinder 1 and the ink will exhaust completely through the exhaust pores 39. When clinging closely to the frontal end face 60 of the vacuum piston, the ink rapidly gets into the exhaust pores 39 under pressure. When the ink gets into the exhaust pores 39 and just flows out of the outlet 47 on the exhaust tubes 46, then press the piston lid 50 into the annular groove 45, with the frontal end face 51 of the piston lid clinging closely to the bottom of the annular groove 45, so as to get the exhaust tubes 46 located entirely within the sealing holes 67 of the piston lid. Because the ink flowing out of the outlet 47 adheres to the joint of the outlet 47 and the sealing hole 67, the outlet 47 is closed entirely by the ink. At the same time, the double fixing columns 44 of the piston lid are pushed and fixed inside the double fixing slots 43, and the singular fixing column 54 is fixed inside the singular slot 55. Therefore, the real vacuum package is achieved.

Referring to FIG. 1 and FIG. 11, to expel the air completely among the vacuum piston 3, the container cylinder 1 and ink, the conic bulge is set on the frontal end face 60 of the vacuum piston. By doing so, at the moment when pushing the vacuum piston 3, because the top face 62 of the conic bulge impacts the ink and thus produces whirlpools, the ink will move toward the circumference of the container cylinder 1 under the impact, then the air around the circumference of the cylinder will be pressed by the ink and flow toward the whirlpools at the center. Next, the air will exhaust out through the exhaust pores 39 around the root of the conic bulge. Meanwhile, the ink moves upward under the action of the inner wall 42 of the cylinder to the periphery of the frontal end of the piston 60. Then, the ink gathers gradually from the periphery of the frontal end face of the piston toward the center, and at the moment the front part of the conic bulge 61 has already penetrated the ink. All air has been compressed around the conic bulge 61 and will exhaust out through the exhaust pores 39 completely. In the end, the air in the ink container will exhaust out more thoroughly.

Referring to FIG. 2 and FIG. 3, when the automatic vacuum ink container is used with automatic ink-supplying equipment, the working pressure pushes the vacuum piston 3 to slide toward the ink supply opening 64. The vacuum piston 3 pushes ink to go though the cavities 17 and be against the inner wall 22 of the annular top; then the annular top 21 brings the WI-shaped spring 23 to stretch and deflect. The moving forward together axially of the WI-shaped spring 23 and the annular top 21 makes the ink supply passage 66 open up, and the ink flows out through the passage 66 and ink supply opening 64, and accordingly the ink supply is achieved. When ink flows out, the pushing force on the inner wall 22 of the annular top disappears, the WI-shaped spring 23 restores rapidly to its original state, and the annular top also goes back to its original place; as a result, ink is cut off, the ink supply is finished. The same process proceeds repeatedly, and accordingly achieves automatic ink supply.

The objective of the present invention has been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. An automatic vacuum ink container[,] comprising:

a container cylinder;

an ink supply valve mounted at one end of the container cylinder for automatically opening and closing passage of the ink; and a vacuum piston, mounted at the other end of the container cylinder and provided with [more than] *at least* one exhaust [hole] *pore*, for exhausting air when packaging ink and for pushing ink toward the ink supply valve when supplying ink;

wherein the ink supply valve comprises a valve lid connected directly with the container cylinder, as well as a valve sleeve embedded into the valve lid;

the valve lid can be pushed by ink to move forward so as to form a space for dispensing ink;

two sloping sealing faces are set respectively around the top of the valve sleeve and on the inner wall of the top of the valve lid, which can cooperate with each other to seal the container and cut off ink;

the [more than] *at least* one exhaust pore is set through the vacuum piston [longitudinally].

2. The automatic vacuum ink container set forth in claim 1, wherein the valve lid comprises an end face connected with the container cylinder, a mouthpiece neck connected with the end face, an annular top with an ink supply opening set at the center, and an elastic coupling connecting the annular top and the mouthpiece neck.

3. The automatic vacuum ink container set forth in claim 2, wherein the sloping sealing face is set around the inner side of the ink supply opening;

the elastic coupling extends down axially from the rim of the annular top, with its lower end connected with the upper end of the mouthpiece neck;

the elastic coupling and the annular top can stretch forward axially;

on the upper end of the inner wall of the mouthpiece neck is set a raised location ring for locating the valve sleeve;

a circular sealing wall extends downwardly and axially at the space between the inner wall of the ink supply opening of the annular top and the elastic coupling;

on the outer wall of the mouthpiece neck are set multiple raised thread latches; under the latches are set corresponding thread latch grooves;

a circular concave sealing groove is provided at the lower part of the inner hole of the valve lid;

an annular embedding groove is set downwardly and axially around the rim of the end face of the valve lid to match the container cylinder.

4. The automatic vacuum ink container set forth in claim 3, wherein the elastic coupling is a WI-shaped spring.

5. The automatic vacuum ink container set forth in claim 1, wherein the valve sleeve comprises a stepped sleeve cylinder, a flat top, and ribs connecting the flat top and the sleeve cylinder; multiple cavities are formed in between the ribs.

6. The automatic vacuum ink container set forth in claim 5, wherein around the rim of the flat top is provided a sloping sealing face, which structurally cooperates with the sloping sealing face of the valve lid;

the ribs specifically connect the upper end of the sleeve cylinder and the lower end of the sloping sealing face of the flat top;

at the upper end face of the sleeve cylinder is set a sealing slot for allowing the circular sealing wall of the valve lid to be inserted into it;

the upper end of the inner wall of the sealing slot is formed to incline toward the center of the slot;

there are raised latches provided at the middle part of the outer wall of the sleeve cylinder to structurally match the raised location ring of the valve lid;

the raised latches press up the sloping sealing face around the rim of the flat top and make it tightly cooperate with the corresponding sloping sealing face of the valve lid;

a sealing skirt is set at the lower end of the stepped sleeve cylinder to structurally match the concave sealing groove of the valve lid;

the raised latches also bring the lower part of the stepped sleeve cylinder up and make the sealing skirt cling to the concave sealing groove of the valve lid tightly.

7. The automatic vacuum ink container set forth in claim 1, wherein the vacuum piston comprises a cylindrical piston body; a conic bulge set at the central area of the frontal end face of the cylindrical body; and a piston lid mounted at the rear end face of the cylindrical piston body to cover the exhaust [pores] *pore*;

the [more than] *at least* one exhaust pore is set on the frontal end face of the cylindrical body around the conic bulge and all the way go to the [real] *rear* end face.

8. The automatic vacuum ink container set forth in claim 7, wherein the conic bulge can match the valve sleeve of the ink supply valve structurally;

[The] *the* inlet of the [more than] *at least* one exhaust [pores] *pore* is set on the frontal end face around the conic bulge and the exhaust [pores are] *pore is* all the way go to the rear end face;

an annular groove is formed on the rear end face in such a manner that the inner and outer wall of the annular groove project out from the rear end face a piston lid is provided to cover and cooperate with the annular groove.

multiple exhaust tubes are set in the annular groove; the said exhaust [pores] *pore* just [extend] *extends* into the exhaust tubes from the frontal end face of the piston and the outlet of the exhaust [pores] *pore* is set on the exhaust tubes; the exhaust tubes are set with the same direction as the exhaust [pores] *pore*.

9. The automatic vacuum ink container set forth in claim 8, wherein the exhaust [pores are] *pore is* axially set on the frontal end face.

10. The automatic vacuum ink container set forth in claim 1, wherein the vacuum piston comprises a cylindrical piston body; a conic bulge set at the central area of the frontal end face of the cylindrical body; and a piston lid mounted at the rear end face of the cylindrical piston body to cover the exhaust [pores] *pore*;

the [more than] *at least* one exhaust pore is set at the lower part of the conic bulge and all the way go through to the real end face of the cylindrical body.

11. The automatic vacuum ink container set forth in claim 8, wherein the piston lid is for covering and cooperating with the annular groove;

there are fixing columns set in the piston lid;

there are fixing slots set on the rear end face of the vacuum piston to match the fixing column set, so as to fix the piston lid;

there are set corresponding sealing holes on the frontal end face of the piston lid to match the exhaust tubes;

the piston lid also has an inner and an outer ring to match the inner and outer wall of the annular groove, respectively.

12. The automatic vacuum ink container set forth in claim 7, wherein on the outer side wall of the vacuum piston is provided an ink-scraping ring, which can interference fit with the inner wall of the container cylinder.

13. The automatic vacuum ink container set forth in claim 1, further comprising a balance cover connected with the ink supply valve for placing steadily and further sealing the ink container; the balance cover comprising:

a bottom plate, a cover cylinder and a central lid;

there are latches set on the inner wall of the central lid;

the central lid is also provided with an inner sealing top;

on the outer wall of the cover cylinder are set an anti-slip grooves;

between the cylinder and the bottom plate are set reinforced plates.

14. The automatic vacuum ink container set forth in claim 1, wherein the container cylinder is made of paper.

*15. The automatic vacuum ink container set forth in claim 1, wherein the exhaust pore is multiple and set through the vacuum piston longitudinally.*

* * * * *